(12) United States Patent
Destruel

(10) Patent No.: US 6,508,452 B2
(45) Date of Patent: Jan. 21, 2003

(54) MOUNTING DEVICE FOR MOUNTING AN ELECTRICAL DEVICE ON TRUNKING

(75) Inventor: Marc Destruel, Senlis (FR)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/879,883

(22) Filed: Jun. 14, 2001

(65) Prior Publication Data

US 2002/0050553 A1 May 2, 2002

(30) Foreign Application Priority Data

Jun. 16, 2000 (FR) .............................. 00 07727

(51) Int. Cl.⁷ .............................................. A47G 29/00
(52) U.S. Cl. ...................................................... 248/694
(58) Field of Search ................................ 248/694, 27.1, 248/309.1; 52/220.1, 220.5; 439/311, 211; 174/101, 48, 66, 53; 220/3.3, 3.92, 394, 4.02

(56) References Cited

U.S. PATENT DOCUMENTS

| | | | | |
|---|---|---|---|---|
| 4,017,137 A | * | 4/1977 | Parks .......................... 339/21 R |
| 4,952,163 A | * | 8/1990 | Dola et al. ................... 439/211 |
| 5,086,194 A | * | 2/1992 | Bruinsma ..................... 174/48 |
| 5,336,849 A | * | 8/1994 | Whitney ....................... 174/48 |
| 5,406,762 A | * | 4/1995 | Buard .......................... 52/287.1 |
| 5,614,695 A | * | 3/1997 | Navazo ........................ 174/48 |
| 5,957,414 A | * | 9/1999 | Perrignon de Troyes et al. 248/27.1 |
| 5,998,732 A | * | 12/1999 | Carveney et al. .............. 174/48 |
| 6,198,043 B1 | * | 3/2001 | Hoffmann ...................... 174/48 |
| 6,211,460 B1 | * | 4/2001 | Hull et al. ..................... 174/48 |
| 6,350,135 B1 | * | 2/2002 | Acklin et al. ................ 439/211 |

FOREIGN PATENT DOCUMENTS

| | | |
|---|---|---|
| DE | 36 43 559 | 6/1988 |
| EP | 0 391 713 | 10/1990 |
| FR | 2 709 614 | 3/1995 |

* cited by examiner

Primary Examiner—Ramon O. Ramirez
Assistant Examiner—Kofi Schulterbrandt
(74) Attorney, Agent, or Firm—Young & Thompson

(57) ABSTRACT

A mounting device for mounting an electrical device on trunking includes an electrical device support and a skirt. The mounting device includes a support shaped to nest in grooves of the trunking and a skirt incorporating two upstanding rims that engage in the grooves and are designed to immobilize the support longitudinally.

21 Claims, 5 Drawing Sheets

MOUNTING DEVICE FOR MOUNTING AN ELECTRICAL DEVICE ON TRUNKING

BACKGROUND OF THE INVENTION

1. Field of the Invention

The invention relates to a mounting device for mounting an electrical device on open trunking. This kind of trunking has a substantially U-shaped profile in cross section. Its continuous longitudinal open side is designed to be closed off by one or more lengths of a cover section nesting over the trunking.

To this end, the trunking includes two parallel grooves defined along respective longitudinal edges of its open side. All the components are obtained by extruding or drawing a material, typically a semi-rigid plastics material, aluminum or another material, for example. They can also be bent to shape from sheet metal.

2. Description of the Prior Art

One prior art mounting device for mounting an electrical device that can be fitted to the trunking itself is substituted for the cover section at a selected location on the trunking. The electrical devices that can be installed in this way are typically socket outlets, telephone jacks, switches, etc.

For example, published French patent No 2 666 479 describes a mounting device of the above kind forming a box in which the electrical device is housed.

When installing wiring, it is desirable for the support on which the electrical device is mounted to be movable longitudinally along the trunking, the final location of the electrical device being determined subsequently.

The invention relates to a two-part mounting device for mounting the above kind of electrical device, one part receiving the electrical device and the other part forming a skirt which covers and surrounds the first part and closes off the trunking locally.

The basic idea of the invention is to immobilize the first part of the mounting device, containing the electrical device, in the longitudinal direction of the trunking, at installation time, by forcibly nesting the second part of the mounting device, forming the skirt.

SUMMARY OF THE INVENTION

To be more specific, the invention therefore provides a mounting device on open trunking of the kind having two parallel grooved portions defining grooves along respective longitudinal edges of its open side, said mounting device including a support for said electrical device provided with interconnecting means, also referred to as nesting means, adapted to cooperate with said trunking and a skirt conformed to be fixed to said support, made from a semi-rigid material and having two inturned or bent longitudinal edges adapted to engage in respective grooves of said trunking and conformed to engage forcibly in said grooves to immobilize said electrical device support longitudinally on fixing said skirt to said support.

In the foregoing definition of the invention, the electrical device support can take the form of a simple frame which preferably includes means for fixing the electrical device; it can also take the form of a box that can be integrated inside the trunking and electrically insulates the electrical device in the trunking. The box can be in one piece with a frame part, the combination constituting said electrical device support and providing the fixing.

In another embodiment, the electrical device support has a part in the form of a frame to which can be attached one or even two insulative housings constituting at least part of a box that can receive the electrical device. The housing can consist of one half-box assembled to the rear face of the frame, for example, or even two complementary half-boxes constituting a complete box. The top part of the support forming the frame of the support can have significantly larger dimensions than the box itself so that it can be mounted on wider trunking, possibly incorporating a plurality of partitions.

A support-skirt assembly is also feasible in which superposed openings exposing the front face of the electrical device are eccentric to the axis of the trunking.

There are various ways to stabilize the longitudinal position of the electrical device support when fixing the skirt.

One way is for the outside surfaces of the two bent longitudinal edges of the skirt to be spaced by a distance corresponding to (in fact slightly greater than) that between the inside surfaces of the outside edges of the grooves of the trunking. This distance can therefore be such that the bent longitudinal edges, on the one hand, and the outside edges, on the other hand, come into rubbing contact when fitting the skirt.

In this case, forcibly nesting the skirt over the electrical device support spreads the lateral walls of the trunking, which clamps the skirt and therefore the electrical device support. Conversely, the inside surfaces of the two bent longitudinal edges of the skirt can be spaced by a distance corresponding to (in fact slightly less than) that between the outside surfaces of the inside edges of the grooves of the trunking, this distance being such that the bent longitudinal edges, on the one hand, and the inside edges, on the other hand, come into rubbing contact when fitting the skirt.

In this case, the clamping which immobilizes the skirt and the electrical device support is operative between the inside edges of the grooves. A combination of the above two clamping arrangements is also feasible.

In particular, the surfaces of the two bent longitudinal edges previously cited can carry raised patterns cooperating with the corresponding edges of the grooves. The patterns are preferably defined on the inside surfaces of the two bent longitudinal edges. They can take the form of parallel ribs substantially perpendicular to the longitudinal direction of the bent longitudinal edges of the skirt. When the skirt is fitted, the patterns are deformed and slightly crushed on coming into contact with the facing edges of the grooves.

According to another advantageous feature, the longitudinal sides of the electrical device support include elastic hooks and spaced projecting rims, respectively adapted to bear on opposite sides of inside longitudinal walls defining the two grooves of this kind of trunking. The hooks are defined between cut-outs in the longitudinal lateral surfaces of the support. The cut-outs impart some elasticity to the hooks, enabling them to retract inwards on forcibly nesting the electrical device support. To allow this, in the absence of the skirt, the electrical device support can slide even though it is nested over the trunking.

The skirt advantageously includes abutments which abut the hooks to immobilize them when they are interengaged with the inside longitudinal walls defining the two grooves of the trunking previously cited. This avoids unintentional "unclipping" when withdrawing a plug, entailing the application of some traction force. The electrical device support includes windows adjacent the hooks and in which said abutments engage at the time of assembling the skirt and the electrical device support. The electrical device support and the skirt have clipping means, known in the art, by means of which they can be fixed together when in position on the trunking, this immobilizing the electrical device support longitudinally, as explained above.

According to another advantageous feature, which is known in itself, at least one transverse lateral face of the electrical device support carries projecting assembly members conformed to cooperate with complementary assembly members of a similar electrical device support, the two electrical device supports being mounted and fastened side by side in the trunking. In this way a plurality of mounting devices in accordance with the invention can be disposed side by side.

The above kind of mounting device can also be designed to receive one or more electrical devices side by side. If the mounting device has to receive several electrical devices, its length (i.e. its dimension in the longitudinal direction parallel to the trunking) is increased. In other words, the electrical device support and the skirt include openings of different lengths according to the number of electrical devices they are to receive.

The invention will be better understood and other advantages of the invention will become more clearly apparent in the light of the following description, which is given by way of example only and with reference to the accompanying drawings.

DETAILED DESCRIPTION OF THE PREFERRED EMBODIMENTS

Figure 1:
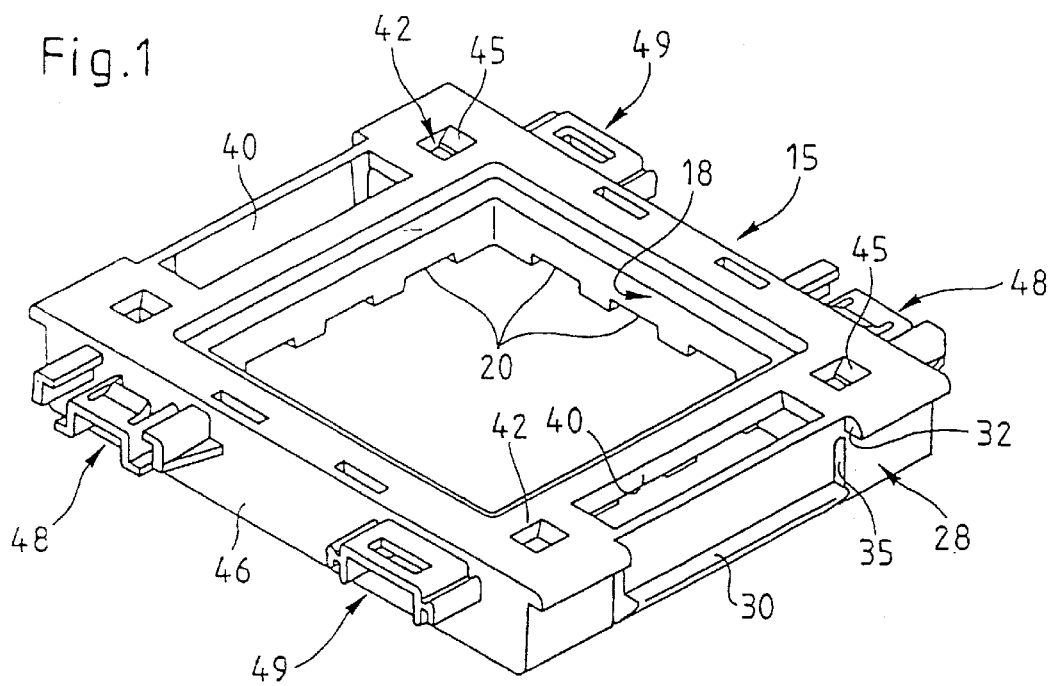
FIG. 1 is a perspective view from above of an electrical device support of a mounting device according to the invention.
Figure 2:
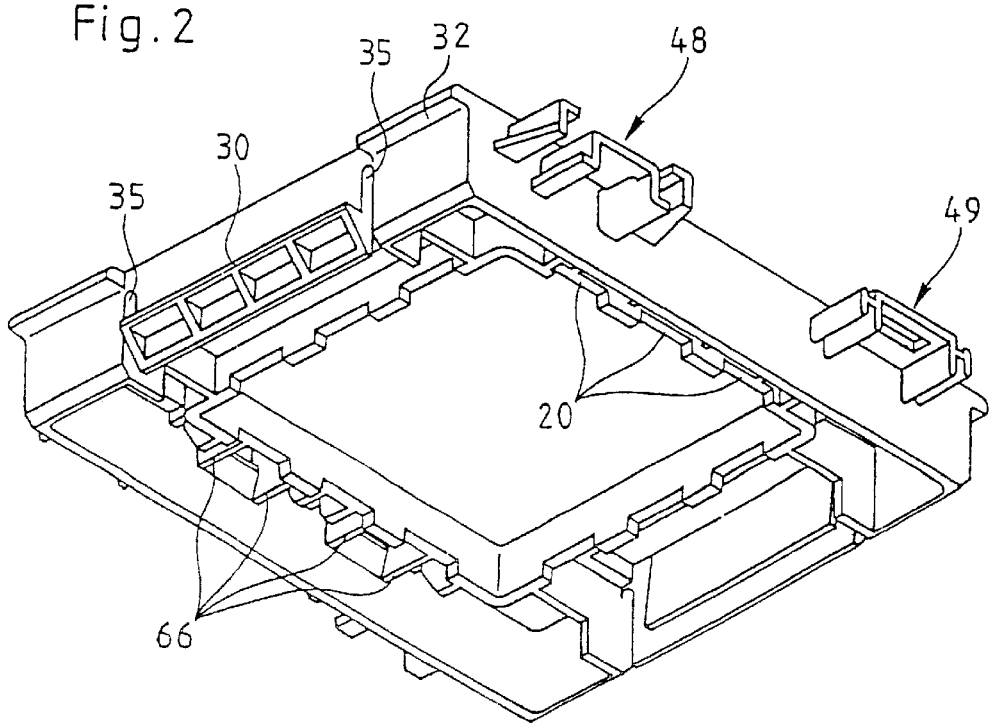
FIG. 2 is a perspective view from below of the same electrical device support.

Referring to FIGS. 1 to 5 in particular, there is shown a mounting device 11 for mounting an electrical device which is designed to be fitted to open trunking 12, known in itself, consisting of a semi-rigid plastics material extrusion. The trunking can instead be made by any of the methods mentioned above. The components of the mounting device 11 are preferably molded from semi-rigid plastics material. The trunking is conventional, has a generally U-shaped cross section and has two parallel grooves 13 along respective longitudinal edges of its open side. Each groove 13 is delimited by an edge portion of a lateral wall 12a of the trunking, a back wall 14 perpendicular to the lateral wall, and an internal longitudinal wall 26 globally parallel to the lateral wall 12a. The mounting device includes an electrical device support 15 adapted to receive an electrical device and a skirt 16 forming an embellisher frame and conformed so that it can be fixed to the electrical device support.

In this example, the general shape of the electrical device support 15 is also that of a frame. It includes a window 18, which is square or rectangular in this example, and whose inside edge has crenellations 20 adapted to receive elastic teeth forming part of an electrical device, not shown.

In the example shown in FIG. 1, the opening 18 is square and dimensioned to receive an electrical device of corresponding dimensions. The skirt 16 forms a frame that is conformed so that it can be fixed to the electrical device support 15. It includes a window 22, which is square in this example, which is superposed over that of the support 15 in the form of a frame.

Figure 4:
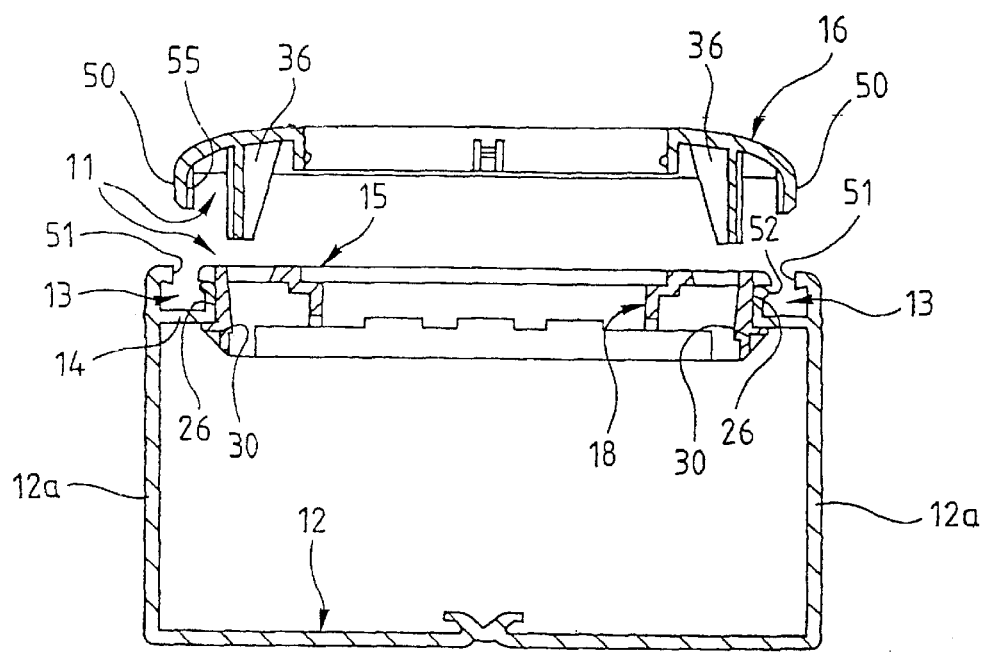
FIG. 4 is a view in cross section showing the electrical device support installed on trunking before fitting the skirt.

FIG. 4 shows that the support 15 is conformed to nest between the internal longitudinal walls 26 of the two grooves 13 of the trunking.

To this end, the longitudinal sides 28 of the support include elastic hooks 30 at the bottom and projecting rims 32 at the top, spaced in the heightwise direction to bear on the respective edges of the internal longitudinal walls 26. The projecting rims 32 rest on the outside edges of the longitudinal walls and the elastic hooks engage under the inside edges of the same internal longitudinal walls, i.e. against the back walls 14.

Figure 6:
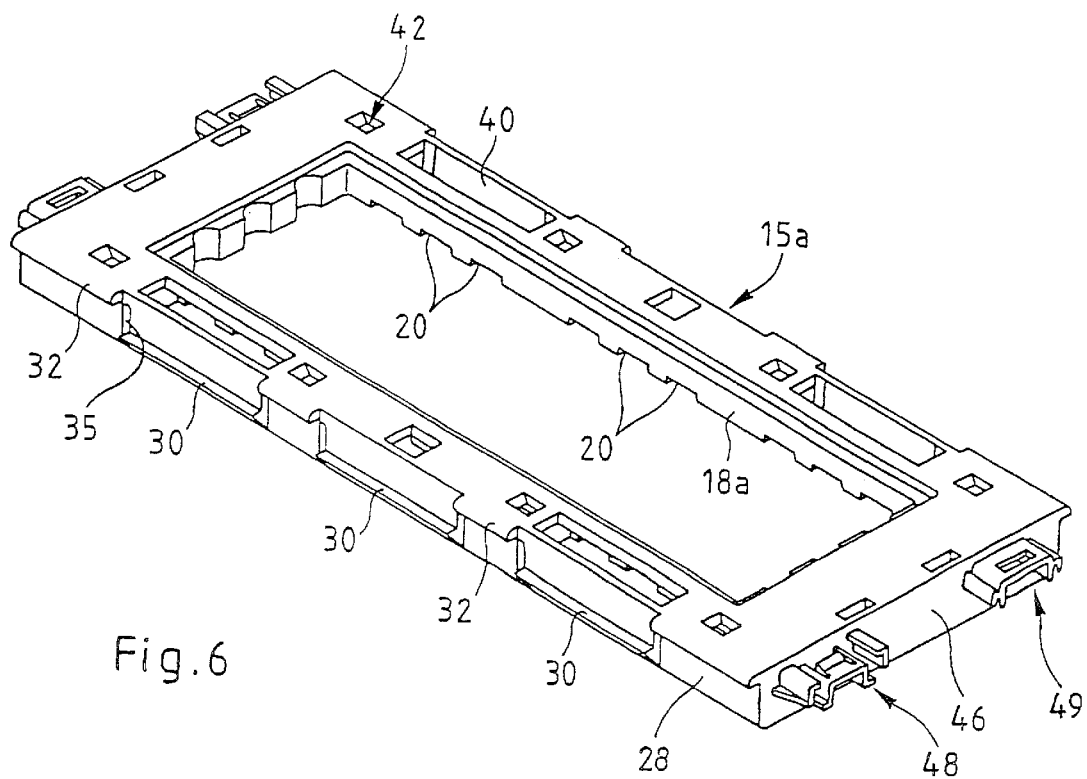
FIG. 6 is a view of another electrical device support similar to that shown in FIG. 1 but able to receive a plurality of electrical devices side by side.

FIGS. 1 and 6 show that the projecting rims 32 and the elastic hooks 30 are offset longitudinally relative to each other along each side of the support. This makes the projecting rims more rigid and the hooks more elastic.

The hooks 30 are defined between cut-outs 35 in the longitudinal sides 28 of the support. This is known in itself.

The skirt 16 further includes abutments 36 which abut the hooks to immobilize them when they are interengaged with the inside edges of the internal longitudinal walls 26.

Figure 5:
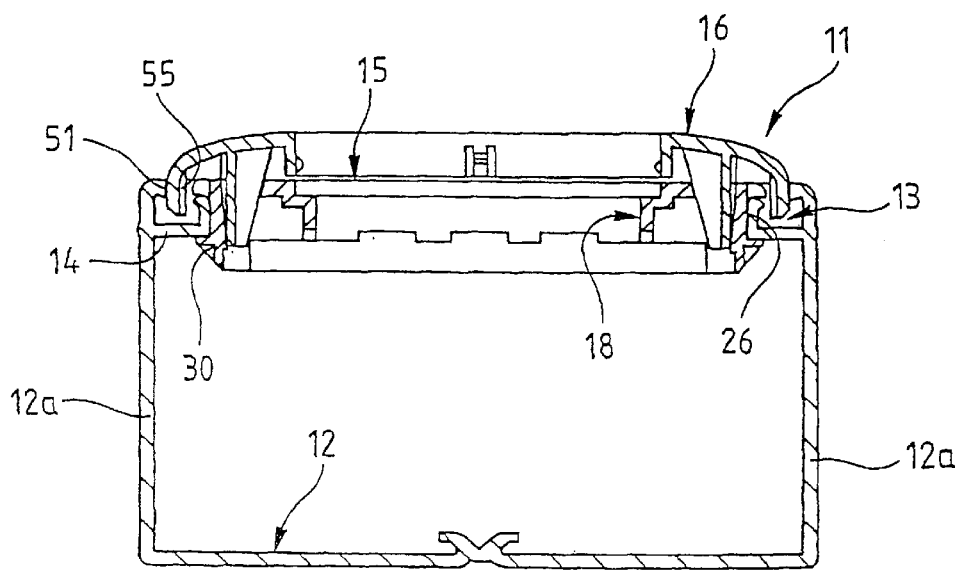
FIG. 5 is a view analogous to FIG. 4 after fitting the skirt.
Figure 4A:
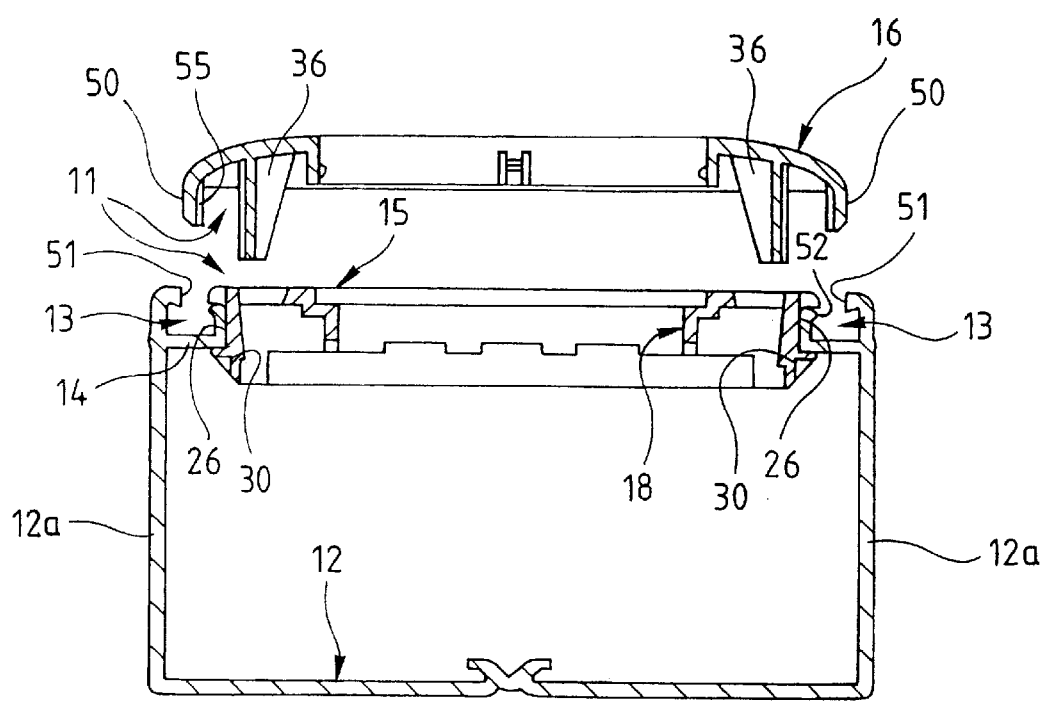
FIG. 4A is also a view in cross section, according to another embodiment, showing the electrical device support installed on trunking before fitting the skirt.

FIG. 5 shows that the immobilization of the elastic hooks 30 by the abutments 36 increases the resistance to pulling off of the electrical device support when the latter is installed on the trunking with its skirt. The electrical device support 18 includes windows 40 adjacent the hooks and in which the abutments can engage when the skirt is assembled to the electrical device support.

The electrical device support and the skirt are provided with clipping means, known in themselves, by means of which they can be fixed together when in position on the trunking. The clipping means consists of holes 42 in the electrical device support and teeth 44 projecting from the inside face of the skirt. In this example the holes 42 are square and each incorporates a ramp surface 45 within its thickness to facilitate interengagement with the teeth 44 of the skirt.

Finally, note that each transverse lateral face 46 of the electrical device support carries assembly members 48, 49, of a type known in the art, conformed to cooperate with complementary assembly members of a similar electrical device support. It is then possible to mount a plurality of electrical device supports in the trunking and to join them together side by side to receive a greater number of electrical devices, which are held contiguously to prevent the penetration of foreign bodies.

In FIG. 6, structural components similar to those of the electrical device support shown in FIG. 1 carry the same reference numbers. The electrical device support 15a is dimensioned to receive three electrical devices side by side. The window 18a is therefore rectangular and elongate in the longitudinal direction. There is of course a corresponding skirt with corresponding shape and dimensions, not shown. An electrical device support+skirt assembly for two devices can also be designed on the same model.

Figure 3:
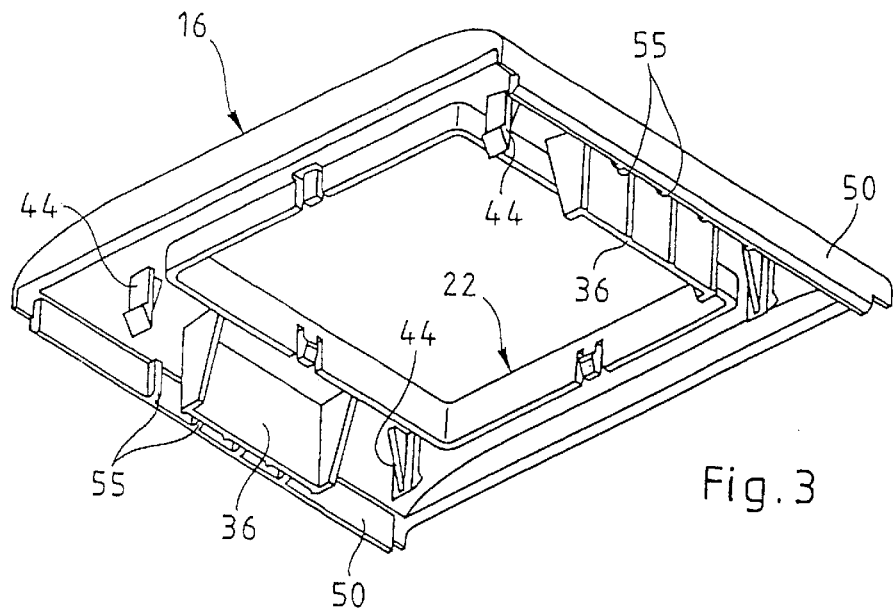
FIG. 3 is a perspective view from below of a skirt that is mounted on the electrical device support shown in FIGS. 1 and 2.

Considering FIG. 3 in particular, it can be seen that the skirt has two bent longitudinal edges 50 adapted to engage in respective grooves 13 of trunking like that shown in FIG. 4.

In accordance with the invention, these edges are conformed to engage forcibly in the grooves to stabilize the longitudinal position of the electrical device support when the skirt is fixed to it by engaging the hooks 44 in the corresponding holes 42.

One possibility (as illustrated in FIG. 5) is for the outside surfaces of the two bent longitudinal rims 50 to be spaced by a distance corresponding to that between the inside surfaces of the outside edges 51 of the grooves 13 of the trunking (in fact slightly greater than that distance), so that the bent longitudinal edges 50 of the skirt, on the one hand, and the outside edges 51 of the grooves, on the other hand, come into friction or rubbing contact when the skirt is fitted, which immobilizes the electrical device support in the position it occupies on the trunking.

Figure 5A:
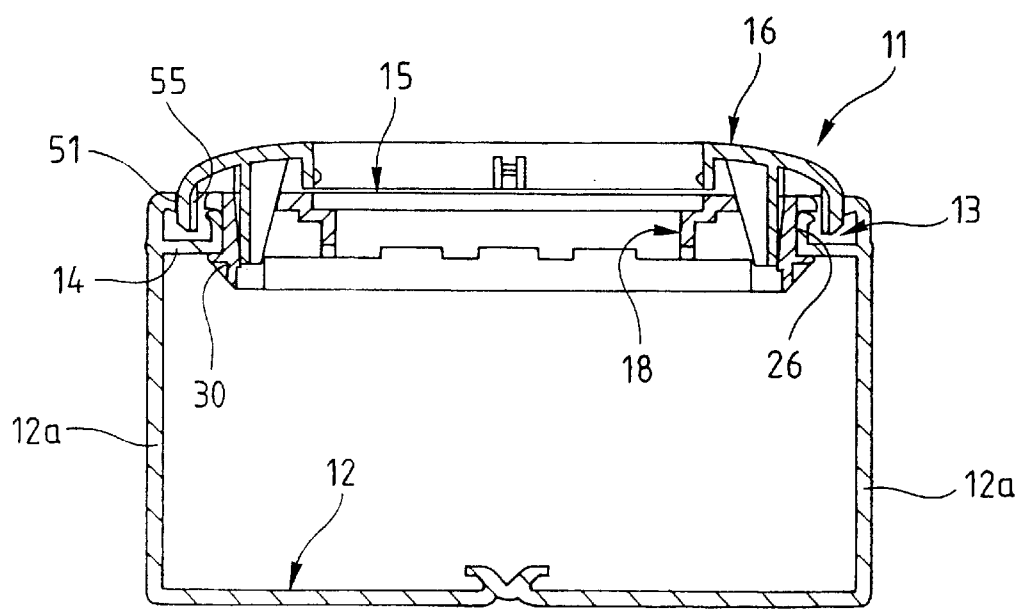
FIG. 5A is a view analogous to FIG. 4A after fitting the skirt.

The opposite arrangement (as illustrated in FIG. 5A) is equally feasible, i.e. the inside surfaces of the two bent longitudinal edges 50A of the skirt can be spaced by a distance corresponding to (in fact slightly less than) that between the outside surfaces of the inside edges 52 of the grooves of the trunking, so that the bent longitudinal edges, on the one hand, and the inside edges 52, on the other hand, come into friction or rubbing contact when fitting the skirt, which immobilizes the electrical device support. The above two arrangements can be combined.

The surfaces of the two bent longitudinal edges previously cited can advantageously be provided with raised patterns cooperating with the corresponding edges of the grooves, as illustrated on FIGS. 4 and 5, FIGS. 4A and 5A.

As illustrated, raised patterns are provided on the inside surfaces of both bent longitudinal edges 50A, as illustrated on FIGS. 4 and 5 and FIGS. 4A–5A, of the skirt. They take the form of parallel ribs 55 which are substantially perpendicular to the longitudinal direction of the bent edges. These ribs tend to deform and to be crushed against the inside edges 52 of the grooves, as illustrated in FIG. 5A.

The arrangement in accordance with the invention that has just been described therefore facilitates the fitting and wiring of electrical devices installed in this kind of mounting device.

Initially, only the electrical device support 15 is nested over the trunking and the selected electrical device (not shown) is mounted on it. The combination can be moved either way in the longitudinal direction of the trunking, which facilitates connecting the electrical device to electrical wires installed in the trunking.

When these operations have been completed, the installer determines the final position of the electrical device along the trunking and if necessary adjusts the position of the electrical device support. All that then remains is to install the skirt, which simply clips forcibly into place, to immobilize the mounting device as a whole permanently on the trunking. This situation is shown in FIG. 5.

Figure 7:
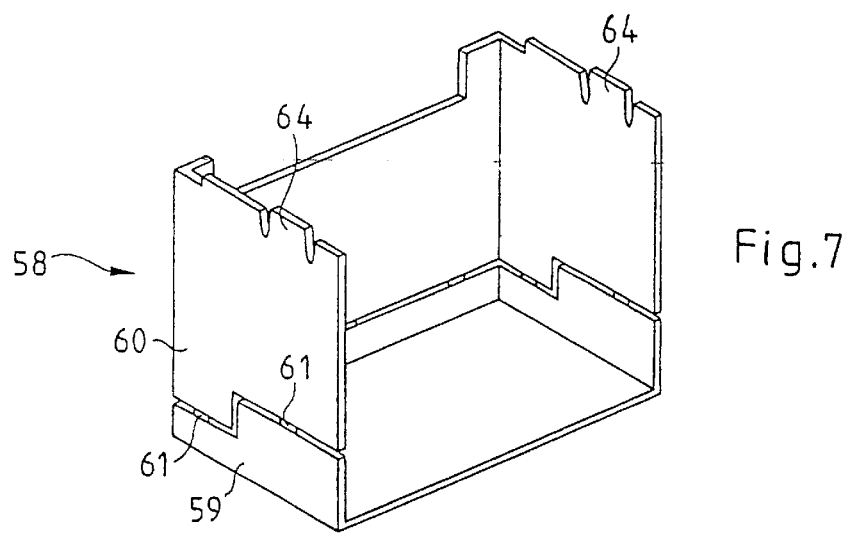
FIG. 7 is a perspective view of an insulative half-box which can be fixed to the electrical device support and accommodated in the trunking.

FIG. 7 shows insulating means in the form of a molded insulative plastics material half-box 58 adapted to be fitted to the bottom face of an electrical device support like that shown in FIG. 1 or FIG. 6. The bottom 59 of the half-box is joined to its body 60 by lugs 61 adapted to be cut easily and can therefore be easily eliminated at the time of fitting. The top edges of the box body include notches defining lugs 64 which engage between projecting fins 66 on the support.

Figure 8:
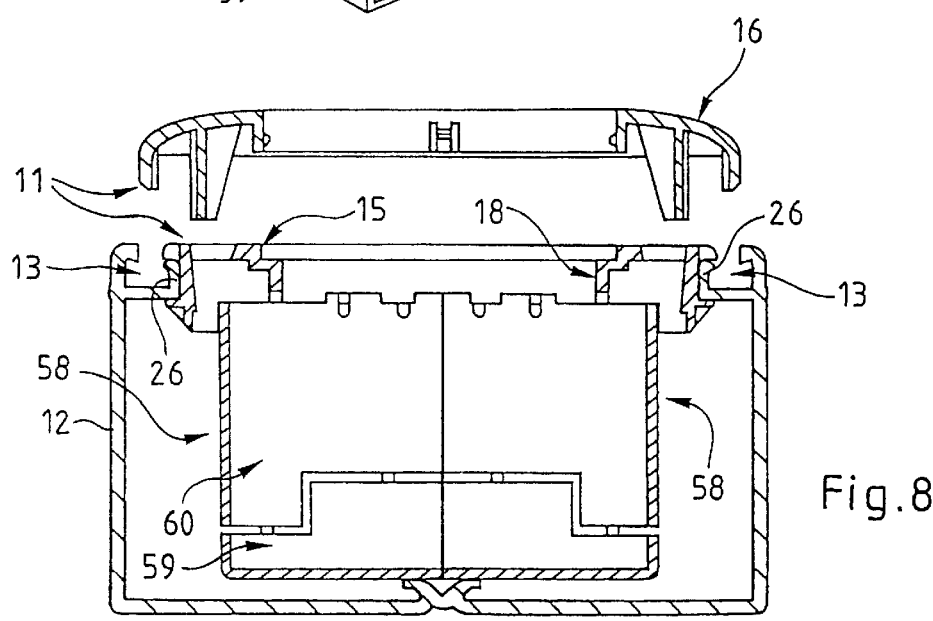
FIG. 8 is a view in cross section of the electrical device support installed in the trunking with two half-boxes as shown in FIG. 7.

In FIG. 8, two half-boxes 58 have been installed side by side, and constitute a complete box insulating the electrical device completely from the remainder of the trunking.

Figure 9:
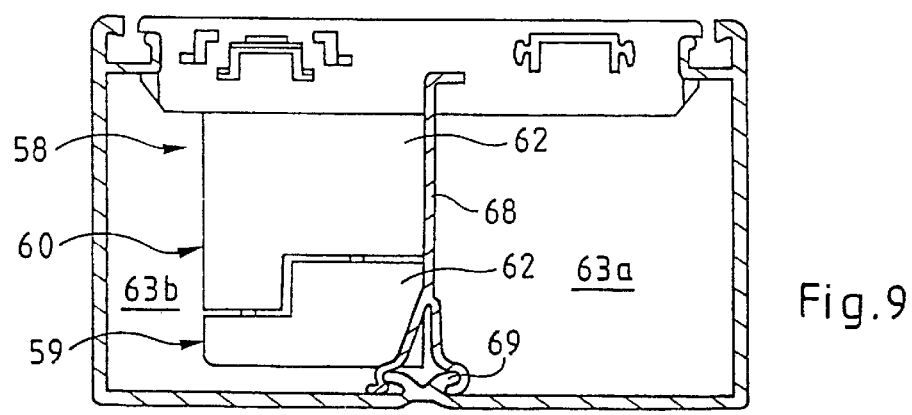
FIG. 9 is a view analogous to FIG. 8 and in which only one half-box is fixed to the electrical device support and cooperates with a longitudinal partition to electrically insulate the component housed in the half-box.

In the FIG. 9 example only one half-box 58 has been fitted. Its faces 62 transverse to the trunking can be extended in the longitudinal direction thereof by a partition member 68 which plugs into a back rib 69. The electrical device is then in the half-box and in one half 63a of the trunking and is completely insulated from the other half 63b of the trunking.

There is claimed:

1. A mounting device for mounting an electrical device on open trunking, the open trunking having two parallel grooved portions defining grooves along respective longitudinal edges thereof, said mounting device including a support for an electrical device and a skirt separate from the support and adapted to be fixed thereto, interconnecting means adapted to cooperate with the trunking, the skirt being made from a semi-rigid material and having two inturned longitudinal edges adapted to engage in respective grooves of the trunking, the inturned longitudinal edges being in forcible engagement in said grooves to immobilize said support longitudinally when the skirt is fixed to the support.

2. The mounting device claimed in claim 1, wherein the distance between the outside surfaces of two inturned longitudinal edges of said skirt is slightly more than to the distance between inside surfaces of outside edges of said grooved portions of the trunking, and said bent longitudinal edges and said outside edges being into friction contact when the skirt is fixed to the support.

3. The mounting device claimed in claim 1, wherein the distance between inside surfaces of said two bent longitudinal edges of said skirt is slightly less than the distance between outside surfaces of inside edges of the grooves of the trunking and said inturned longitudinal edges and said inside edges being in friction contact when said skirt is fixed to the support.

4. The mounting device claimed in claim 1, wherein surfaces of said two bent longitudinal edges have deformable portions adapted to deform when in operative engagement with corresponding edges of the grooved portions.

5. The mounting device claimed in claim 4, wherein said deformable portions are defined on inside surfaces of said two inturned longitudinal edges.

6. The mounting device claimed in claim 5, wherein said deformable portions comprise parallel ribs substantially perpendicular to the longitudinal direction of said inturned longitudinal edges.

7. The mounting device claimed in claim 1, wherein said interconnecting means comprise elastic hooks and spaced projecting rims respectively adapted to bear on edges of longitudinal inside walls defining the two grooved portions of the trunking.

8. The mounting device claimed in claim 7, wherein said projecting rims and said elastic hooks are longitudinally offset relative to each other.

9. The mounting device claimed in claim 7, wherein said hooks are defined between cut-outs in said longitudinal sides of said support.

10. The mounting device claimed in claim 7, wherein said skirt includes abutments, said abutments being in abutting relation with said hooks to immobilize the hooks when the hooks are interengaged with the inside longitudinal walls of the two grooved portions of the trunking.

11. The mounting device claimed in claim 10, wherein said support includes windows adjacent said hooks, said abutments being engaged in said windows when said skirt is assembled to said support.

12. The mounting device claimed in claim 1, wherein said support is frame-shaped and dimensioned to receive at least one electrical device.

13. The mounting device claimed in claim 1, wherein said support and said skirt have clipping means for fixing them together in position on the trunking.

14. The mounting device claimed in claim 13, wherein the clipping means comprises holes in said support and teeth projecting from an inside face of said skirt.

15. The mounting device claimed in claim 1, wherein at least one transverse lateral face of said support has assembly members cooperable with complementary assembly members of a similar support, and the support and the similar electrical device support being adapted to be mounted in the trunking and attached side by side.

16. The device claimed in claim 1, wherein the support includes means for fitting insulating means.

17. The mounting device claimed in claim 1, wherein surfaces of said two bent longitudinal edges have crushable portions adapted to crush when in operative engagement with corresponding edges of the grooved portions.

18. The mounting device claimed in claim 17, wherein said crushable portions are defined on inside surfaces of said two inturned longitudinal edges.

19. The mounting device claimed in claim 18, wherein said crushable portions comprise parallel ribs substantially perpendicular to the longitudinal direction of said inturned longitudinal edges.

20. The mounting device claimed in claim 1, wherein said interconnecting means are provided on said support and engage opposed surfaces of said grooved portions.

21. The mounting device claimed in claim 20, wherein said interconnecting means are elastically deformable.

* * * * *